(12) United States Patent
Wang et al.

(10) Patent No.: US 8,437,913 B2
(45) Date of Patent: May 7, 2013

(54) STEERING PULL COMPENSATION

(75) Inventors: Dexin Wang, Livonia, MI (US); Paul George Sanders, Milan, MI (US)

(73) Assignee: Ford Global Technologies, Dearborn, MI (US)

( * ) Notice: Subject to any disclaimer, the term of this patent is extended or adjusted under 35 U.S.C. 154(b) by 768 days.

(21) Appl. No.: 12/209,911

(22) Filed: Sep. 12, 2008

(65) Prior Publication Data
US 2010/0070135 A1   Mar. 18, 2010

(51) Int. Cl.
*A01B 69/00*   (2006.01)

(52) U.S. Cl.
USPC .................................................. 701/41

(58) Field of Classification Search ............. 701/41, 701/201
See application file for complete search history.

(56) References Cited

U.S. PATENT DOCUMENTS

| | | | |
|---|---|---|---|
| 3,576,229 A | 4/1971 | Rivard | |
| 4,690,233 A | 9/1987 | Daido | |
| 4,708,354 A | 11/1987 | Moore | |
| 5,309,373 A | 5/1994 | Beebe et al. | |
| 5,422,810 A | 6/1995 | Brunning et al. | |
| 5,642,281 A | 6/1997 | Ishida et al. | |
| 5,709,281 A | 1/1998 | Sherwin et al. | |
| 5,845,222 A * | 12/1998 | Yamamoto et al. | 701/41 |
| 5,941,338 A * | 8/1999 | Miller et al. | 180/421 |
| 6,184,821 B1 | 2/2001 | Hrovat et al. | |
| 6,250,421 B1 | 6/2001 | Poshadlo | |
| 6,496,762 B2 * | 12/2002 | Kurishige et al. | 701/41 |
| 6,598,699 B2 * | 7/2003 | Takehara et al. | 180/446 |
| 6,671,595 B2 | 12/2003 | Lu et al. | |
| 6,863,150 B1 | 3/2005 | Tanaka et al. | |
| 6,947,577 B2 * | 9/2005 | Stam et al. | 382/104 |
| 6,965,582 B1 | 11/2005 | Moulsley | |
| 6,983,818 B2 * | 1/2006 | Fujioka et al. | 180/446 |
| 7,191,061 B2 | 3/2007 | McKay et al. | |
| 7,233,311 B2 * | 6/2007 | Okubo et al. | 345/108 |
| 7,247,111 B2 * | 7/2007 | Yamanaka et al. | 475/2 |
| 7,356,396 B2 * | 4/2008 | Mori et al. | 701/41 |
| 7,373,230 B2 * | 5/2008 | Rattapon et al. | 701/41 |
| 7,580,790 B2 * | 8/2009 | Jansson | 701/201 |
| 7,725,227 B2 * | 5/2010 | Pattok et al. | 701/41 |

FOREIGN PATENT DOCUMENTS

| | | |
|---|---|---|
| EP | 0822130 | 2/1998 |
| EP | 1247723 | 10/2002 |
| EP | 1767437 | 3/2007 |
| FR | 2843805 | 2/2004 |

* cited by examiner

*Primary Examiner* — Hussein A. Elchanti
(74) *Attorney, Agent, or Firm* — Angela M. Brunetti; Raymond Coppiellie

(57) ABSTRACT

A method for steering pull compensation to maintain a steering load below a predetermined threshold value. A straight line driving condition is verified through vehicle sensors and/or GPS, drive torque control is performed such that the steering load is kept below the predetermined threshold value. The steering pull compensation method may be disabled by a vehicle operator and is disabled in the absence of a verified straight line driving condition.

18 Claims, 4 Drawing Sheets

|  | Baseline - hands off wheel without pull compensation | | Torque correction by driver | | Wheel torque vectoring at front | |
|---|---|---|---|---|---|---|
|  | 2 deg Crown | 4 deg Crown | 2 deg Crown | 4 deg Crown | 2 deg Crown | 4 deg Crown |
| Drift displacement ( m, positive to right ) | 16.2 | 32 | 0.1 | 0.05 | - 0.242 | - 0.7 |
| Lateral acceleration ( g ) | 0.03 | 0.07 | 0 | 0 | 0 | 0 |
| Body side slip ( deg ) | - 0.02 | - 0.04 | - 0.15 | - 0.31 | - 0.22 | - 0.44 |
| Steering wheel angle ( deg ) | 1.1 | 2.11 | - 1.6 | - 3 | 0.88 | 1.9 |
| Steering wheel torque ( deg ) | 0 | 0 | - 1.2 | - 2.4 | 0 | 0 |
| Front total tire lateral force ( N ) | 0 | 0 | - 353† | - 710 | - 272 | - 553 |
| Front total tire aligning moment ( N-m ) | 0 | 0 | - 13.3 | - 26.6 | - 9.6 | - 19.36 |
| Rear total tire lateral force ( N ) | 0 | 0 | - 226‡ | - 454 | - 318 | - 637 |
| Front total tire aligning moment ( N-m ) | 0 | 0 | - 6.7 | - 13.3 | - 9.1 | - 18.2 |
| Front left steer ( deg ) | 0.14 | 0.2 | 0.05 | 0.02 | 0.15 | 0.22 |
| Front right steer ( deg ) | - 0.02 | - 0.05 | - 0.11 | - 0.13 | - 0.01 | - 0.07 |
| Front left tire slip ( deg ) | - 0.07 | - 0.07 | 0.11 | 0.29 | 0.07 | 0.21 |
| Front right tire slip ( deg ) | 0.08 | 0.09 | 0.26 | 0.44 | 0.22 | 0.37 |
| Rear left tire slip ( deg ) | 0.02 | 0.03 | 0.18 | 0.34 | 0.24 | 0.46 |
| Rear right tire slip ( deg ) | - 0.02 | - 0.02 | 0.13 | 0.29 | 0.20 | 0.41 |

FIG. 4

| | Road crown 2 degrees | Road crown 4 degrees |
|---|---|---|
| Left hand side of Eqn ( 2 ) in N-m | 19 when $F_d = 2 \times 50$ ( N - m ) / 0.343 | 38 when $F_d = 2 \times 100$ ( N - m ) / 0.343 |
| $F_f$ using Eqn ( 2 ) in Newtons | - 288 ( Full Vehicle Simulation output = - 272 ) | - 576 ( Full Vehicle Simulation output = - 553 ) |
| $F_r$ using Eqn ( 3 ) in Newtons | - 342 ( Full Vehicle Simulation output = - 318 ) | - 684 ( Full Vehicle Simulation output = - 637 ) |
| F using Eqn ( 4 ) in Newtons | - 630 | - 1260 |
| $\alpha = ( 180 / \pi )$ F / ( mg ) in degrees | 2.2 | 4.3 |

FIG. 5

STEERING PULL COMPENSATION

TECHNICAL FIELD

The invention relates to steering systems and more particularly to steering pull compensation in a steering system.

BACKGROUND

In a steering system a steering wheel is typically coupled to a steering column, or shaft, in order for a driver to steer a vehicle. When the driver is travelling in essentially a straight-line path, the steering wheel is generally centered in a neutral position so as to have little effect on the path of travel. However, outside influences may require the steering wheel be rotated a small amount away from center in order to steer the vehicle substantially straight-ahead.

In cases where the steering wheel is pulled in one direction by outside influences, the driver must exert some force to prevent the vehicle from deviating from its intended straight-line path. This is commonly known as "steering pull" and can be caused by many outside influences such as road surface crown, tire properties, and vehicle front-end misalignment.

When a vehicle is driving on a road crown or road band, the side force on the vehicle due to the gravity force pushes the vehicle to one side. If the steering wheel is free to move, the vehicle will steer in the direction of the side force, denoted as F, in a circle such that the radius, denoted as R, is determined by the equation:

$$m\frac{V^2}{R} = F \quad (1)$$

where V is the vehicle speed and m is the vehicle mass. The greater the side force, F, or the larger the road crown angle, the larger lateral drift of the vehicle and the smaller a turning radius.

To keep straight line driving, the vehicle lateral acceleration must be zero and either the vehicle yaw rate must be zero or the vehicle side slip must be constant. To meet these conditions, the forces and moments resulting from the side force, F, must be balanced by the forces and moments from the vehicle's tires so that a total lateral force, as well as a total yaw moment on the vehicle, are zero.

As discussed above, in a vehicle without automatic pull compensation, the driver must turn the steering wheel against the side force direction such that the front and rear tire forces and moments are developed thereby meeting the two necessary conditions.

Constant steering effort is necessary for driving straightforward on a road with road-crown or road bank and increases driver fatigue over time. Existing steering pull compensation strategies use the driver's steering efforts as a reference to introduce a correction torque in the vehicle, in particular in a vehicle equipped with electric power assisted steering. This means the driver must first feel the torque before the torque can be compensated. Once a steering pull condition has been detected, there is a need for a control system in the vehicle to correct steering pull, in a short period of time or before the driver feels the effect of steering pull.

SUMMARY

The inventive subject matter is a method for compensating for the presence of a side force by identifying a straight line driving condition, initiating closed-loop control of a steering wheel drive torque to maintain steering forces to a predetermined threshold according to the independent claims with variations as described in the dependent claims.

DESCRIPTION OF DRAWINGS

A more complete understanding of the present invention may be derived by referring to the detailed description and claims when considered in connection with the following illustrative figures. In the following figures, like reference numbers refer to similar elements and steps throughout the figures.

FIG. 4 is a table comparing vehicle response in straight line driving conditions with and without application of the method of the present invention; and FIG. 5 shows the road crown angle estimation method of the present invention.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention.

Figure 1:
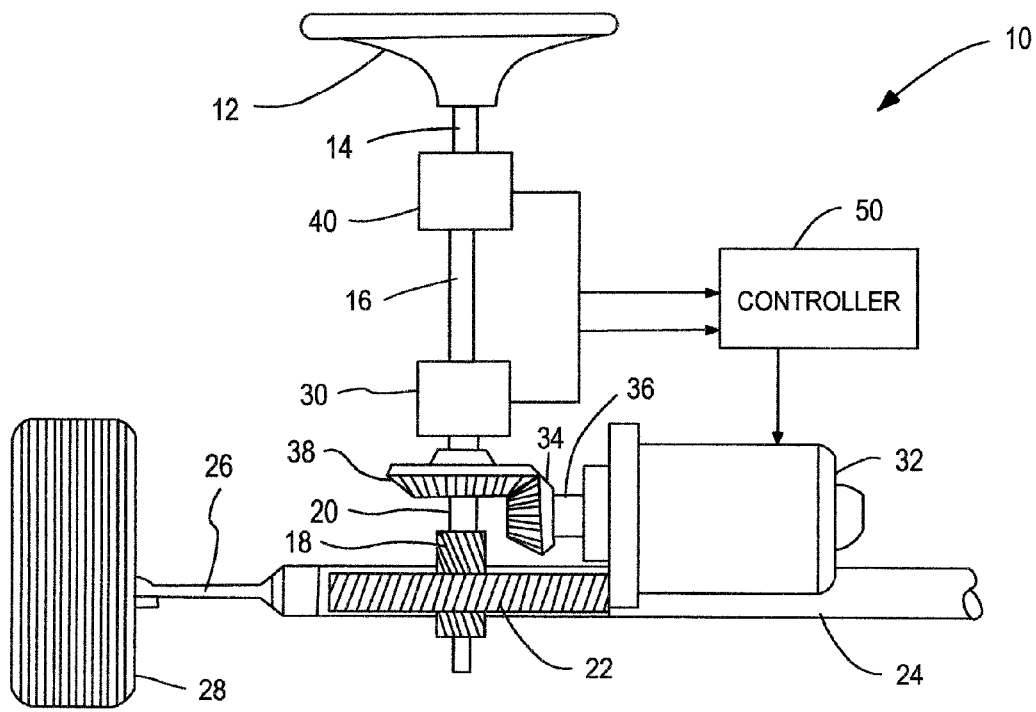
FIG. 1 is an electrically assisted power steering system.

Referring to FIG. 1, an electrically assisted power steering system 10 includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and wheel 28 in a conventional manner. A steering torque sensor 30 is incorporated in the steering shaft 16 for detecting a steering torque applied by an operator to the steering shaft 16 by way of the steering wheel 12. A steering wheel angle sensor 40 senses a steering wheel angle. An electric motor 32 includes an output gear 34 mounted on an output shaft 36 for drivingly engaging an assist input gear 38 mounted on the steering shaft 16. The steering system is controlled by controller 50. It should be noted that this is only one example of several possible configurations for an electrically assisted power steering system. While an electrically assisted power steering system is shown, it should be noted that the inventive subject matter is equally applicable to a hydraulic steering system as well. A sensor providing the steering wheel torque is required from the steering system.

The aim of the inventive subject matter is to have zero steering load. Steering load may be a sensed steering wheel torque, an estimated rack force, or an estimated or sensed steering assist torque. In order to accomplish zero steering load, the aligning moments on a vehicle's front wheel must be balanced such that a steering moment around a steering axis is balanced. This is achieved by the moments of differential traction forces on the steering axis and represented by:

$$\Sigma \pm F_d(r_s + r_t \sin(\mp \lambda)) = F_f(t_p + t_m) \quad (2)$$

Where $t_p$ and $t_m$ are tire pneumatic and mechanical trail lengths, $r_s$ is a scrub radius, $r_t$ is tire loaded radius, $r_{t0}$ is tire unloaded radius, $\lambda$ is Kinpin inclination angle, $F_d$ is a differential traction force, and $F_f$ is a total front tire lateral force.

Figure 2:
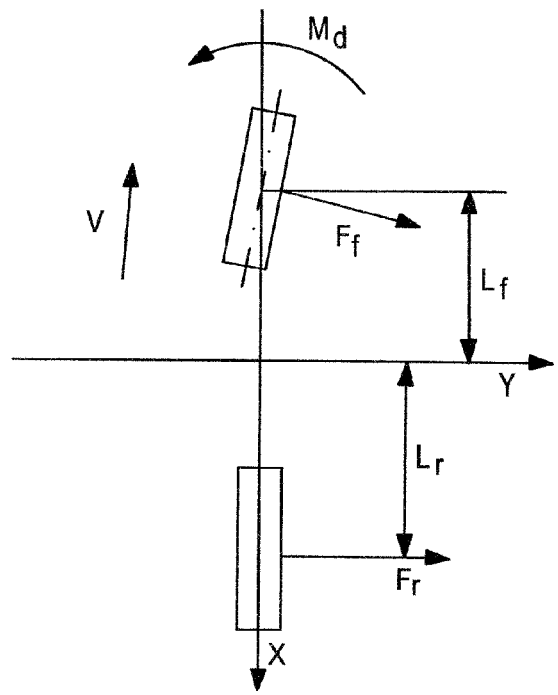
FIG. 2 is an illustration of force balance of a vehicle driving a straight line on a road crown.

FIG. 2 is an illustration of force balance of a vehicle driving a straight line on a road crown. For the steady state vehicle motion, the moment, $M_d$ from the front traction force difference and the side force F, satisfy the following relationships:

$$M_d - F_f l_f + F_{rf} l_r + M_{af} + M_{ar} = 0 \quad (3)$$

$$F + F_f + F_r = 0 \quad (4)$$

Where $l_f$ is the distance from the front wheels to a vehicle center of gravity, $l_r$ is the distance from the rear wheels to the vehicle center of gravity, $F_r$ is the total rear tire lateral force, $M_{af}$ is the total front tire aligning moment due to tire pneumatic trail, and $M_{ar}$ is the rear tire aligning moment due to tire pneumatic trail. $M_{af}$ and $M_{ar}$ are much smaller than other terms and can essentially be neglected in Equation (3). Equations (2), (3), and (4) hold at a vehicle side slip angle for a given side force.

Figure 3:
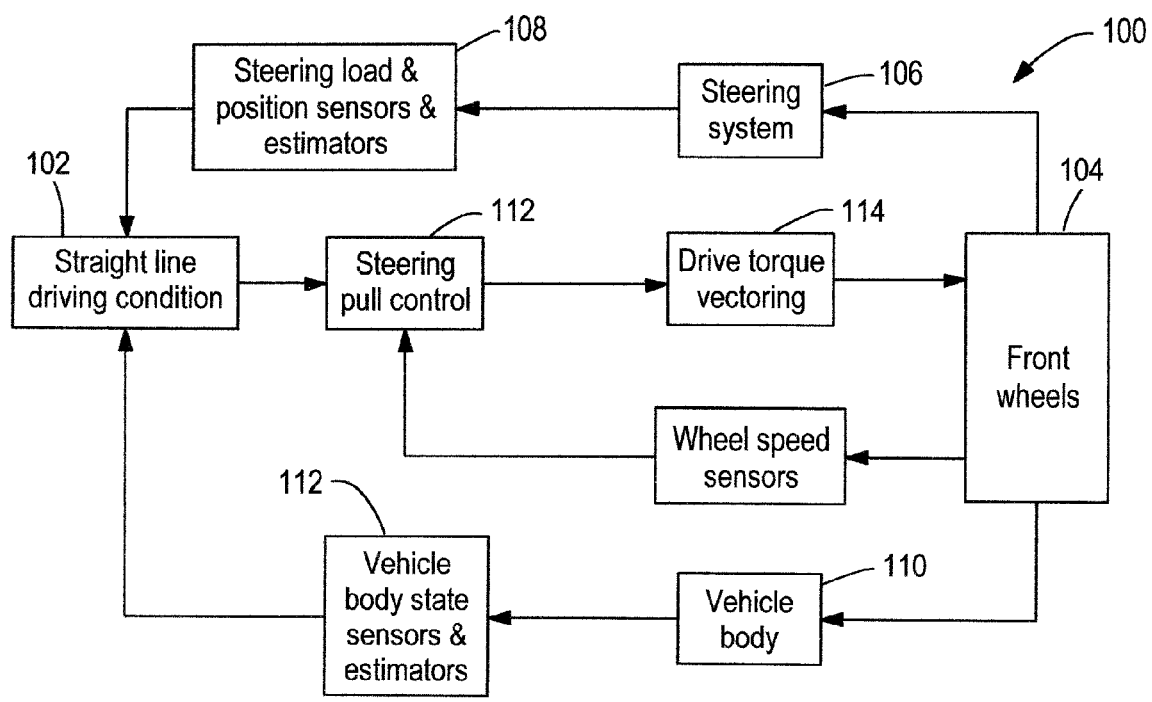
FIG. 3 is an example of a control schematic of the method of the inventive subject matter.

A control schematic 100 of the method of the inventive subject matter is shown in FIG. 3. A straight line driving condition is identified 102 by any one of several methods. For example, a GPS system may be used to verify a straight line path in the presence of steering torque and steering wheel angle that indicates otherwise. In the alternative or in conjunction, vehicle sensors of yaw rate and lateral acceleration may also be used. One skilled in the art is capable of determining this condition based on information and data available from various sensors and systems on the vehicle, too numerous to mention herein. In any case, information about the front wheels 104 is provided by the steering system 106 to provide steering load, position sensor information and estimation information 108. The vehicle body 110 has various vehicle body state sensors and estimators 112, the information from which is used along with the steering system information to determine a straight line driving condition 102.

In the event a curved road is identified, as by a GPS, the steering pull compensation loop control is not active. In the event the steering wheel angle, $\theta_{sw}$ and a steering load, $T_{steer}$ do not meet pre-defined conditions, the steering pull compensation loop control is not active. The pre-defined conditions may be based upon $\theta_{sw} T_{steer} >$ a predetermined threshold value based on driver input. The pre-defined condition may also be based on $\dot{\theta}_{sw} = 0$, and $T_{steer} \neq 0$, indicating a straight line driving condition with steering pull, or the vehicle cornering on a constant radius. A zero, or a predetermined threshold, is a negligible level when a signal cannot be differentiated from signal noises or sensor errors.

Once a straight line driving condition has been identified 102, closed loop control 112 is initiated in a controller to maintain steering load 114 below a predetermined threshold value as discussed above relative to Equations (2), (3) and (4). The closed-loop control maintains the drive torque such that the steering load is maintained at a level less than a predefined threshold value.

Used in Equation (2), the tire pneumatic trail for low-level tire lateral slip is approximated as:

$$t_p \approx \frac{1}{3} a_c \approx \frac{1}{3} a_{c0} \sqrt{\frac{F_z}{F_{z0}}}, \quad (5)$$

where $a_{c0} = \sqrt{r_{t0}^2 - r_t^2}$ is half tire-road contact length under a tire load $F_{z0}$, and $a_c$ is half tire-road contact length under the current tire load $F_z$.

Having the tire pneumatic and mechanical trails, and knowing the vehicle weight and the position of the vehicle center of gravity, information of the applied moment $M_d$ by the controller, the method estimates road crown angle, $\alpha$, from the side force, F, using Equations (2), (3), (4) and the following relationship:

$$F = (mg)\sin(\alpha) \quad (6)$$

When the driver steers the hand wheel toward a potential drift direction, which is identified using $\theta_{sw}$, $T_{steer}$, and $\dot{\theta}_{sw} T_{steer}$, pull compensation is gradually attenuated, depending on a desired SWA-SWT gradient. When the driver steers the hand wheel against a potential drift direction, also identified using $\theta_{sw}$, $T_{steer}$, and $\dot{\theta}_{sw} T_{steer}$, the wheel torque differentiation will retain the value for the estimated road crown.

When the road crown changes during straight line driving, the method will continuously control the drive shaft torque differentiation 114 such that the straight line driving is maintained based on the steering load, the steering wheel rate, the vehicle body yaw rate and lateral acceleration, and any available GPS information. The vehicle drift direction may also be identified.

The inventive subject matter has been demonstrated through modeling of a vehicle with a total mass of 1704 Kg using an ADAMS model. Vehicle parameters are given as:
  Track=1.566 m
  Unloaded tire radius=0.364 m
  Load tire radius for given tire size and corner weight (4955 N)=0.343 m
  Cater trail=0.0257 m
  Kinpin inclination angle=12 degrees
  Scrub radius=−0.005 m
  Front wheel to vehicle center of gravity distance=1.062 m
  Rear wheel to vehicle center of gravity distance=1.558 m Driving was simulated at a vehicle speed of 100 Km/h for ten seconds on roads with 2-4 degrees road crown angle. FIG. 4 represents the simulation results in a table format. The first two columns indicate hands-off driving simulating no applied steering forces. It is clear that the vehicle motion satisfies Equation (1) and the drift displacement, 16.2 m and 32 m respectively, is significant. The third and fourth columns indicate the vehicle operator pulling the steering wheel to maintain straight line driving. While drift displacement is kept to a minimum (0.01 m and 0.05 m respectively), the steering wheel torque signal indicates significant effort on the part of the driver, which, for long durations, may lead to driver fatigue. The fifth and sixth columns represent application of the inventive subject matter. It is clear that with the wheel torque control, both the steering wheel torque and the vehicle lateral drift displacement are diminished.

FIG. 5 is a table that represents the road crown angle estimation according to the inventive subject matter. The method of the inventive subject matter estimates $\alpha=2.2°$ and $4.3°$ for the simulated road crown angles of 2° and 4° respectively. The calculations are shown using Equations (2), (3), and (4) as described herein.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for compensating for steering pull during straight line driving, conditions using a controller in a motor vehicle, the method comprising the steps of:
   verifying a straight line driving condition of the motor vehicle; and
   adjusting drive torque output by the controller to maintain steering load below a predetermined threshold value only during the verified straight line driving condition.

2. The method as claimed in claim 1 wherein the step of adjusting drive torque further comprises adjusting drive torque in response to an estimated road crown angle.

3. The method as claimed in claim 2 further comprising the step of estimating road crown angle from a side force.

4. The method as claimed in claim 3 wherein the step of estimating road crown angle from the side force further comprises calculating side force from wheel force information.

5. The method as claimed in claim 4 wherein wheel force information is provided by an applied drive torque and steady state vehicle equations of motion.

6. The method as claimed in claim 4 wherein wheel force information is provided by vehicle body state sensors and estimations.

7. The method as claimed in claim 6 wherein wheel force information is provided by an applied drive torque and steady state vehicle equations of motion.

8. The method as claimed in claim 1 wherein the step of verifying a straight line driving condition is accomplished using a GPS.

9. The method as claimed in claim 1 wherein the step of verifying a straight line driving condition is accomplished using a yaw rate sensor and a lateral acceleration sensor.

10. The method as claimed in claim 9 wherein the step of verifying a straight line driving condition is accomplished using a GPS.

11. The method as claimed in claim 6 wherein the step of verifying a straight line driving condition is accomplished using a yaw rate sensor and a lateral acceleration sensor.

12. The method as claimed in claim 6 wherein the step of verifying a straight line driving condition is accomplished using a GPS.

13. The method as claimed in claim 12 wherein the step of verifying a straight line driving condition is accomplished using a GPS.

14. A method for compensating for steering pull during straight line driving conditions, the method comprising the steps of:
   verifying a straight line driving condition of a motor vehicle;
   sensing steering load, steering wheel rate, vehicle body yaw rate, and lateral acceleration;
   estimating road crown angle from the relationship between a sensed vehicle side fierce, a sensed applied moment, a known vehicle weight, a known vehicle center of gravity position, and a tire pneumatic trail estimate for low-level tire lateral slip; and
   adjusting drive torque output by a controller based on sensed values and the estimated road crown angle to maintain steering load below a predetermined threshold value only during a straight line driving condition.

15. The method as claimed in claim 14 wherein the step of adjusting the drive torque may be disabled on demand.

16. The method as claimed in claim 14 wherein the step of verifying a straight line driving condition further comprises comparing a product of the steering wheel rate and a steering load to a predetermined threshold, whereby in the event the product exceeds the predetermined threshold, a straight line driving condition is verifiable.

17. The method as claimed in claim 14 wherein the step of verifying a straight line driving condition further comprises sensing a steering wheel rate that approaches zero and sensing a steering load that is not equal to zero.

18. The method as claimed in claim 14 wherein the step of adjusting drive torque further comprises dynamically compensating drive torque in response to changes in the estimated road crown angle.

* * * * *